(12) United States Patent
DeRoos et al.

(10) Patent No.: US 9,170,874 B2
(45) Date of Patent: Oct. 27, 2015

(54) PROVIDING A POTENTIAL SOLUTION

(75) Inventors: Stephen M DeRoos, Vancouver, WA (US); John A Landry, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 13/550,878

(22) Filed: Jul. 17, 2012

(65) Prior Publication Data

US 2014/0025992 A1    Jan. 23, 2014

(51) Int. Cl.
*G06F 11/00* (2006.01)
*G06F 11/07* (2006.01)
*G06F 11/32* (2006.01)

(52) U.S. Cl.
CPC ........ *G06F 11/0793* (2013.01); *G06F 11/0748* (2013.01); *G06F 11/327* (2013.01)

(58) Field of Classification Search
CPC   G06F 11/0793; G06F 11/327; G06F 11/0748
See application file for complete search history.

(56) References Cited

U.S. PATENT DOCUMENTS

| | | | |
|---|---|---|---|
| 6,857,013 B2 | 2/2005 | Ramberg et al. | |
| 7,926,718 B2 | 4/2011 | Miyashita et al. | |
| 8,055,887 B2 | 11/2011 | Karstens | |
| 2002/0074407 A1 | 6/2002 | Koyanagi et al. | |
| 2004/0089727 A1 | 5/2004 | Baharav et al. | |
| 2007/0152061 A1* | 7/2007 | Blanford | 235/462.32 |
| 2007/0168571 A1* | 7/2007 | Ramsey et al. | 710/8 |
| 2009/0108057 A1 | 4/2009 | Mu et al. | |
| 2009/0157530 A1 | 6/2009 | Nagamoto et al. | |
| 2009/0250512 A1 | 10/2009 | Deck et al. | |
| 2010/0174599 A1 | 7/2010 | Rosenblatt et al. | |
| 2010/0211687 A1 | 8/2010 | Jaber et al. | |
| 2010/0228585 A1* | 9/2010 | Bradley | 705/7 |
| 2010/0296744 A1 | 11/2010 | Boon et al. | |
| 2010/0325490 A1* | 12/2010 | Anvin et al. | 714/37 |
| 2011/0073647 A1 | 3/2011 | Chiou | |
| 2011/0154009 A1* | 6/2011 | Harmer | 713/2 |

(Continued)

FOREIGN PATENT DOCUMENTS

| | | | |
|---|---|---|---|
| JP | 2005-333379 A | 12/2005 | |
| JP | 2006-252053 A | 9/2006 | |

(Continued)

OTHER PUBLICATIONS

IBM, A Method of Providing Error Handling Information of a Digital Equipment Using a Two Dimensional Bar Code and a Cellular Phone, APR. 4, 2006, ip.com,IPCOM000135213D,pp. 1-3.*

(Continued)

*Primary Examiner* — Amine Riad
(74) *Attorney, Agent, or Firm* — International IP Law Group PLLC (57) ABSTRACT

An example provides potential solutions for UEFI devices. The example includes scanning an information code generated by the UEFI device while the UEFI is operating according to a UEFI environment. The example further includes requesting a potential solution from a decision device. The request specifies an information code comprising resource information and one or more parameters for a current state of the UEFI environment. The example also includes presenting a representation of the potential solution.

20 Claims, 7 Drawing Sheets

(56) References Cited

U.S. PATENT DOCUMENTS

| | | |
|---|---|---|
| 2011/0258031 A1 | 10/2011 | Valin et al. |
| 2011/0264645 A1 | 10/2011 | Mital et al. |
| 2012/0223131 A1 | 9/2012 | Lim et al. |
| 2013/0026241 A1 | 1/2013 | Sakahashi et al. |
| 2014/0231504 A1 | 8/2014 | DeRoos et al. |

FOREIGN PATENT DOCUMENTS

| | | |
|---|---|---|
| JP | 2009-140204 A | 6/2009 |
| JP | 2011-008693 A | 1/2011 |

OTHER PUBLICATIONS

Non-Final Office Action, U.S. Appl. No. 14/240,391, Date Issued: Nov. 14, 2014, pp. 1-10.

E. Malirief, "Computer Troubleshooting-QR Codes for Android Cell Phones," Jun. 14, 2011, 1 page, Hostmonster.com.

International Search Report and Written Opinion, International Application No. PCT/US2011/054354, Date: Apr. 19, 2012, pp. 1-7.

Utkarsh, "QR Codes Resolved," Apr. 11, 2011, pp. 1-3, Mtaram's Daze.

* cited by examiner

PROVIDING A POTENTIAL SOLUTION

BACKGROUND

A Unified Extensible Firmware Interface (UEFI) device is a computing device that implements a typical UEFI environment on computing devices, such as a personal computer or a server. The UEFI is a pre-boot environment that manages the firmware and basic input output system (BIOS). Further, in the UEFI environment, diagnostics and other tests can be performed. However, this environment is typified by limited graphics and connectivity options. As such, solutions to errors in this environment are limited to generic solutions that can be implemented within these constraints.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION OF SPECIFIC EMBODIMENTS

In the following detailed description, reference is made to the accompanying drawings, which form a part hereof, and in which is depicted by way of illustration specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Various products generate matrix codes that encode information to enable a user to access a specific document or application via a Web address or uniform resource locator (URL). The specific web address is encoded in the matrix code at the time the matrix code is created. In this way, specific solutions may be provided to users willing to search the website for solutions. However, many such products may not have access to the Internet when the event occurs, e.g., an event in the UEFI environment. Moreover, the error code or web address may be long or otherwise challenging for the user to manually remember and enter into a web browser, or on a remote device. Manual entry may result in erroneous entries and frustration.

Embodiments of the claimed subject matter provide a UEFI device that generates and displays a matrix code, such as two-dimensional (2D) barcode, in the UEFI environment. The UEFI device generates the 2D barcode in response to a specific error, or as an output from a tool, such as a diagnostic tool. In one embodiment, the 2D barcode encodes a solution Identification URL, and parameters describing various parameters describing the UEFI device. The parameters described in the matrix code may be derived from the UEFI device and, from diagnostics and tests that can be run in or accessed from the UEFI environment. A reader device scans the 2D barcode, which may be translated into a URL that sends the parameters to a solution identification service. The solution identification service uses the parameters to determine a potential solution. Various avenues of solution may be provided, including but not limited to displaying solution steps on the reader device, and automatically ordering a user-replaceable part.

Information codes, such as matrix codes, may encode web addresses and parameters, such as the error code. The information code may then be scanned and analyzed by a decision device with access to the internet, or a database with product resources. The product resource may include a diagnostic solution to an error message, a maintenance or installation instruction, additional product information, access to a customer service representative, and so on. The decision device provides specific product resources that enable users to obtain additional information related to the user's specific product and targeted to the specified parameters.

Figure 1:
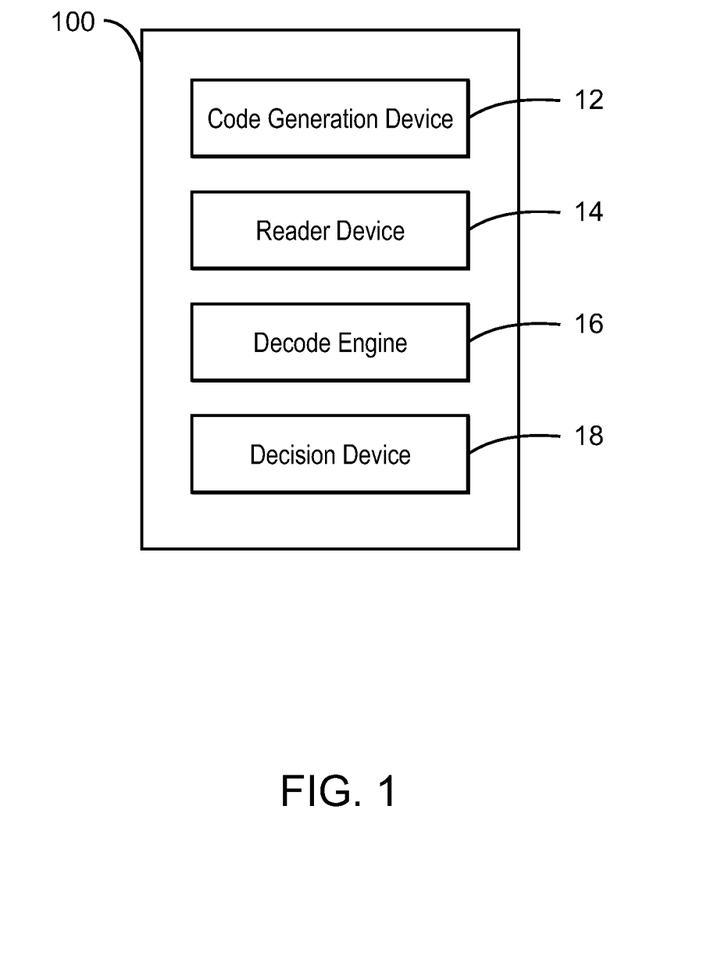
FIG. 1 illustrates a block diagram of a system to provide a potential solution for unified extensible firmware interface (UEFI) according to an example.

FIG. 1 illustrates a system to provide a product resource according to an example. The system 100 includes a code generation device 12, a reader device 14, a decode engine 16, and a decision device 18. The code generation device 12 is a UEFI device that generates an information code. The information code may be a matrix code, such as a 2D barcode, that is scannable.

Figure 2:
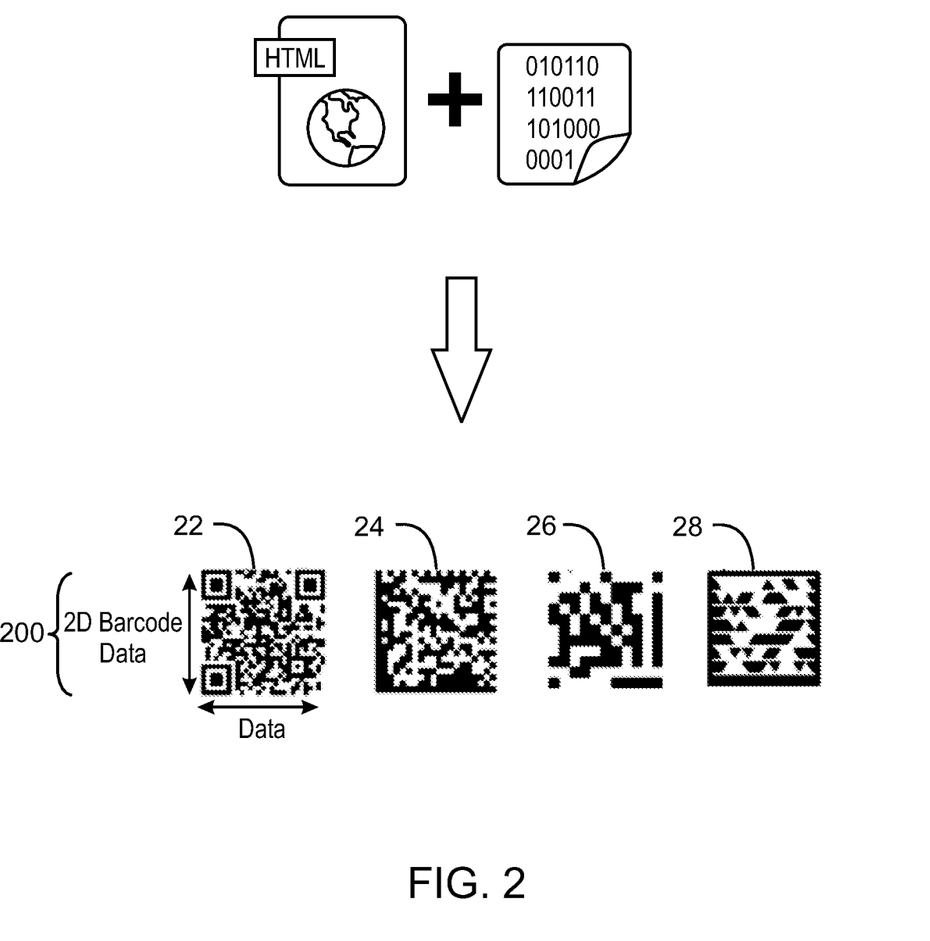
FIG. 2 illustrates information codes according to examples.

FIG. 2 illustrates information codes 200 according to examples, such as a QR Code® 22, a data matrix 24, an EZCode® 26, and a Microsoft® Tag 28. The information codes 200 illustrated provide the ability to transfer a large amount of data using one or more simple codes. The use of the term, information code 200, refers to one or more codes containing data that may be read individually and in combination with another code. For example, a single information code 200 or multiple information codes 200 may be concatenated together to store and provide information in a simple and efficient manner.

The information code 200 specifies an information resource 21 and at least one product parameter 23. The information resource 21 may be a Web address for a general search engine, a specific product or manufacturer web site, access to a dedicated database, and the like. Such dedicated databases may be stored on the decision device 18 or a remote server (not shown). In one embodiment, the information resource 21 may provide a general resource for additional information, and not a static Web address for specific solutions, nor an information page identifiable at the time the information code 200 is generated. The product parameters 23 may include data related to the product, such as an error or event code, a product identifier, a device language, a user language, a serial number, version, and so on. The product parameters 23 may also include an encryption identifier useable when the code generation device 12 encrypts data in the information code 200. The decision device 18 uses the product parameters 23 with the information resource 21 to dynamically provide additional information, such as a solution, to a problem, assistance in diagnosing the problem, and assistance getting customer service.

The information code 200 provides a dynamically generated code that combines the information resource 21 and the at least one product parameter 23. In this way, the product resource obtained using the information code 200 is not hard-coded into the code 200, but dynamically generated based on the state of the product at the time the information code 200 is generated.

The code generation device 12 may be integrated into or connected to the product to generate the information code 200. For example, an error code may be generated on a device not connected to the internet, such as a refrigerator. The error code may be transmitted to a device connected to the Internet, such as a mobile device, or a computer, using the information code 200 via the reader device 14. The code generation device 12 may also encrypt at least one of the information resource 21 and the at least one product parameter 23 that is encoded in the information code 200 for secure transmission of the information code 200.

Figure 3:
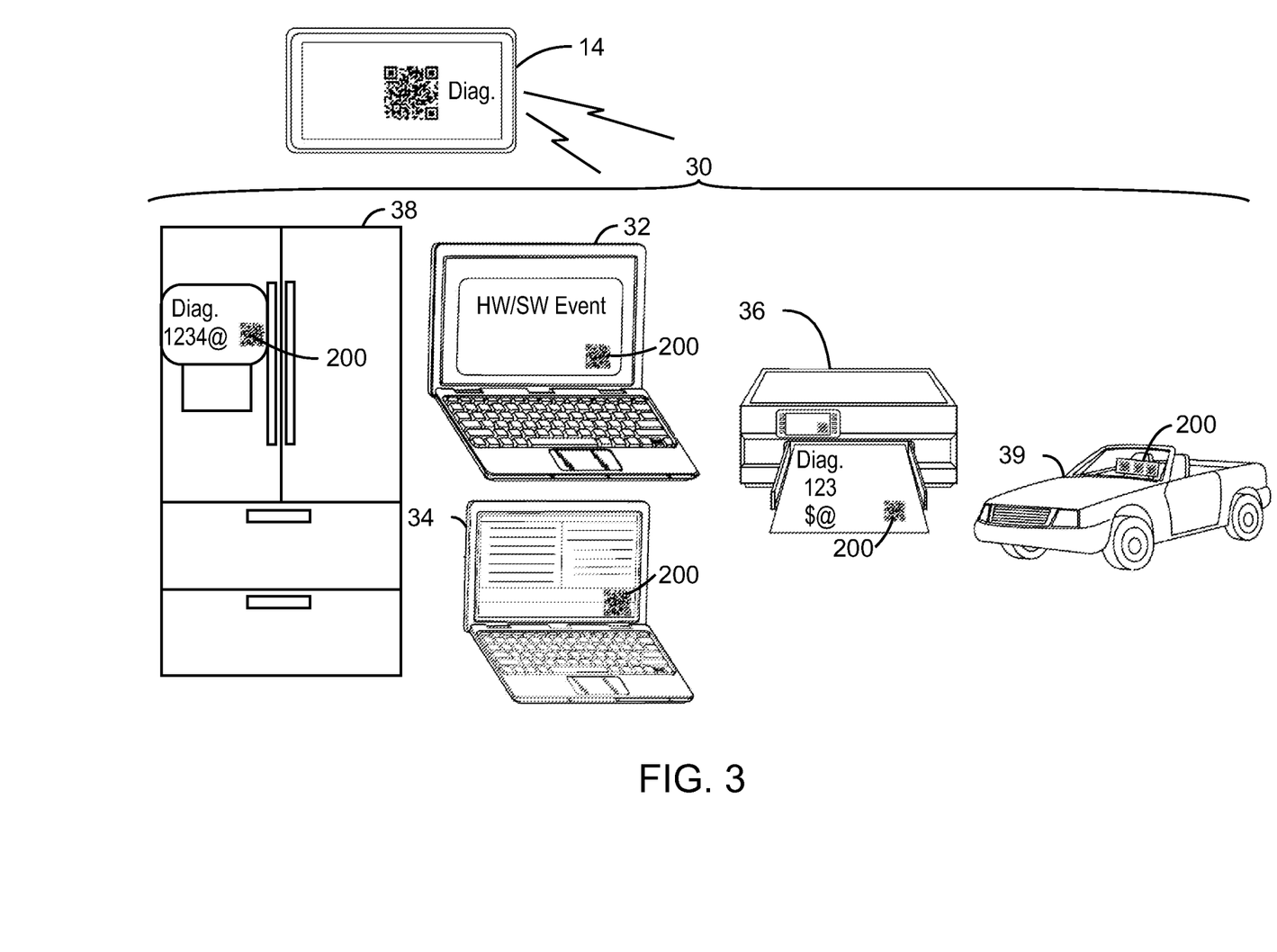
FIG. 3 illustrates examples of a reader device and products that may use a code generation device.

The reader device 14 obtains the information code 200 from a product. FIG. 3 is a diagram of an example reader device 14 and example products 30 useable with the code generation device 12 according to examples. The reader device 14 may be a standalone device that includes the decode engine 16. Alternatively, the reader device 14 may be connected to or integrated into the decision device 18, which has access to the internet. The reader device 14 reads one or more information code 200 and the decode engine 16 decodes the information code 200 to obtain the information resource 21 and the at least one product parameter 23. The decode engine 16 may utilize an error correction feature that corrects errors in the information code 200 obtained by the reader device 14.

The reader device 14 is illustrated as a mobile telephone with a camera. The camera may capture an image of the information code 200, and the mobile telephone may include a decode engine 16 that decodes the information code 200 and obtains the information resource 21 and the at least one product parameter 23 therefrom. Other examples include a special scanning device and/or a web camera that may take a picture of an information code 200, such as a two-dimensional barcode or matrix code and read, transmit, and/or interpret the information encoded therein.

The term product refers to a good, a service, and/or a combination thereof. Examples of the products 30 include a computing device 32 with hardware or software that registers an event or message, a computing device 34 with operating system messages, such as an error before an operating system loads or installation instructions (i.e., UEFI), basic input/output system (BIOS)), a printer 36 with an error messages, a household appliance, such as a refrigerator 38 with an error or maintenance message, and/or an automobile 39 with an error or maintenance message. Use of the information codes 200 in products that have limited access to a user interface or the Internet enables a user to obtain additional information using the decision device 18. Moreover, the automobile 39 shows an information code 200 that contains three information codes 200 that when concatenated may provide a larger amount of information than, for example, a single 2D barcode provides. The information code 200 may be concatenated by the reader device 14 or the decision device 18 in accordance with the claimed subject matter.

Figure 4:
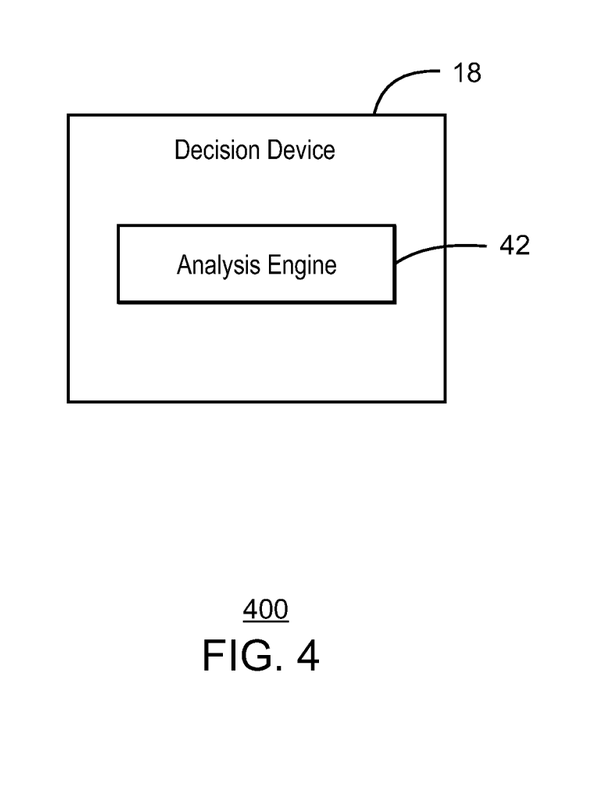
FIG. 4 illustrates a block diagram of a decision device according to an example.

FIG. 4 illustrates a decision device 18 to provide a product resource according to an example. The decision device 18 receives, from the reader device 12, the information contained in the information code. In once embodiment, the decision device 18 is receives the information code from a connected decode engine 16. The decision device 18 may be a server or other computing device connected to the internet or other network having access to a database. The decision device 18 includes an analysis engine 42.

The analysis engine 42 searches the information resource 21 using the at least one product parameter 23 to identify at least one search result. Then, the analysis engine 42 dynamically analyzes the at least one search result to provide the product resource, including information related to a product 30 and at least one product parameter 23. Examples of the information related to a product 30 include a diagnostic solution, a query response, a customer service contact, and/or the at least one product parameter. The product resource includes information specific to a product 30 and/or event code. The product resource may be filtered according to the parameters and may include a solution or information that is up to date, even though such information may change throughout the product's lifecycle. The analysis engine 42 may also decrypt the information resource 21 and the at least one product parameter 23 when the information code 200 is received from the reader device 12. The decryption analysis engine 42 may receive an encryption identifier or an encryption key from the information code 200.

Figure 5:
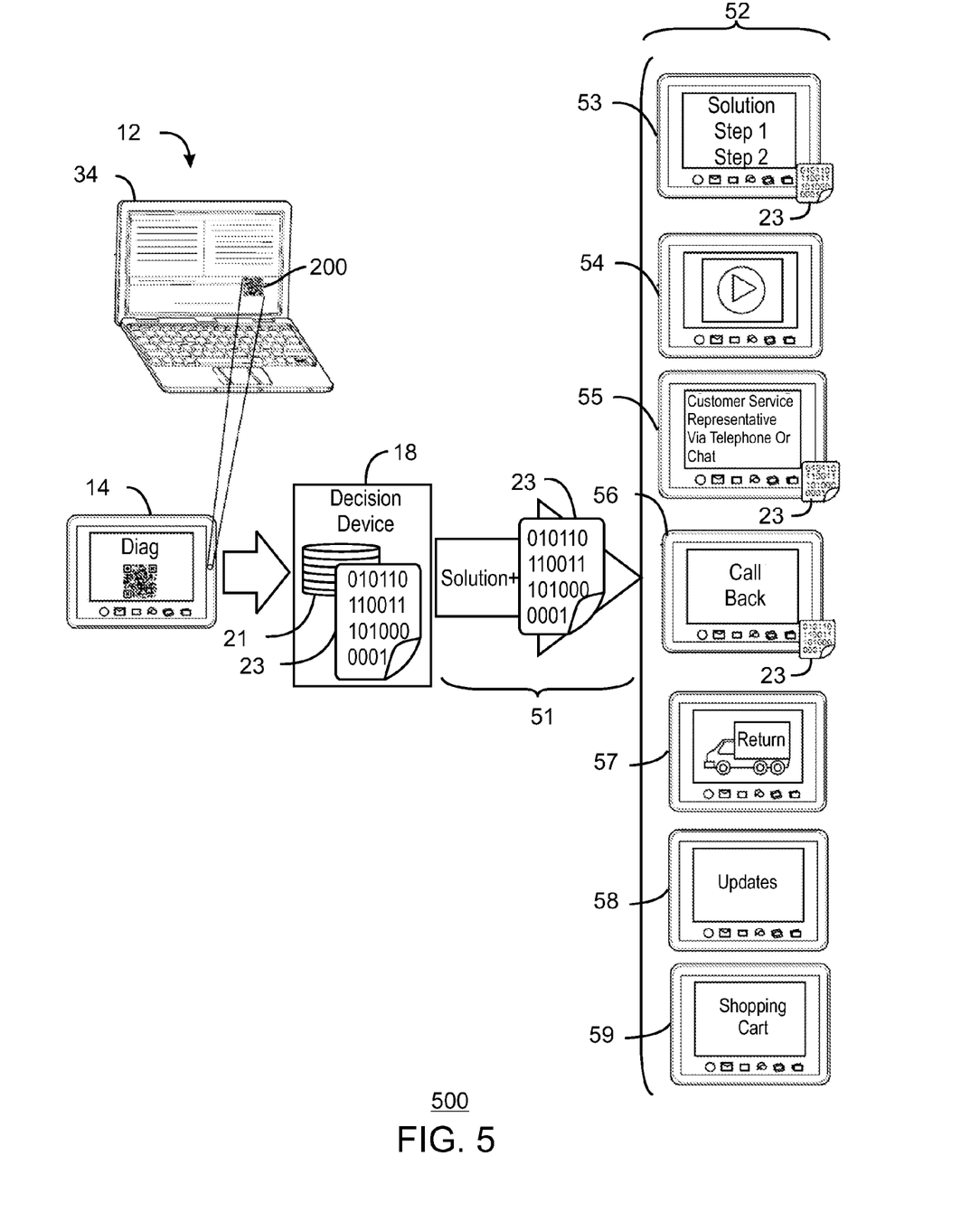
FIG. 5 illustrates use of the decision device to provide product information to a user according to examples.

FIG. 5 illustrates use of the decision device 18 to provide product resource(s) to a user according to examples. FIG. 5 includes the information code 200 on the computing 34. An example problem in a UEFI environment may prevent an operating system from starting up in the primary operating environment. Accordingly, the code generation device 12 may generate the information code 200. The information code 200 enables the user to use a reader device 14, for example, a mobile device with a camera, to find a solution or to troubleshoot the problem with the UEFI device. The reader device 14 is separate from the computing device 34 with the operating system message. Since the computing device 34 is not functional in its current state, the reader device 14 is used to obtain the additional information using the decision device 18.

Referring to FIG. 5, the information code 200 is read by the reader device 14, illustrated as a mobile device, such as a tablet. The reader device 14 captures the information code 200 and decodes it. The decision device 18 receives the information resource 21 and the at least one product parameter 23 from the reader device 14 or decode engine 16. The analysis engine 42 may also decrypt the information resource 21 and/or the at least one product parameter 23 using an encryption identifier or encryption key when the information code 200 includes encrypted information. The analysis engine 42 of the decision device 18 then provides the product resource 51 to the user.

The product resource 51 is illustrated to include the parameters that were part of the information code 200. The product resource 51 may be presented to a user via a user interface, for example, a display 52. The display 52 may be connected to the decision device 18, such as a computer monitor; or integrated into the decision device 18, such as a mobile device with a screen. Examples of the product resources 51 are illustrated in FIG. 5. The product resource 51 may also include a set of instructions that include information extracted from the product parameters 23. The set of instructions may be a diagnostic solution to an error code, installation instructions to install or reinstall a hardware or software portion of the product 30. The set of instructions may be presented via an audio or visual presentation device, such as a list of instructions 53 or an audio and video presentation 54 with instructions.

Another example includes a product resource 51 that allows a user to interact with a customer service representative 55, such as via a real-time chat over the Internet or via telephone. Moreover, the user may receive a call back 56 from the customer service representation or an automated message that provides the product resource 51 to the user. For example, the call back 56 may be via the reader device 14 or a device connected to the reader device 14 that has a microphone and speaker attached. The product resource 51 may also automatically transmit or provide the product parameters 23 to enable the customer service representative to better assist users. Advantageously, the customer service representative may know the problem, the solution, product serial code, or warranty information, without the user manually (i.e., via typing or orally) transmitting data contained in the product parameters 23.

The product resource 51 may further provide instructions for returning 57 the product, receiving a care pack 58, e.g., a free accessory for the product. The product resource 51 may also include a user-replaceable part for the product. In one embodiment, the decision device 18 may automatically order the part for delivery to a user's home address. Replacement parts may correct the error, by replacing a part, or correcting a faulty part. The product resource 51 may also provide information to return, or obtain additional replacement parts. The product resource 51 information may assist the user in composing requests by automatically transferring information about the product, such as the product parameters) 23 using the decision device 18.

Figure 6:
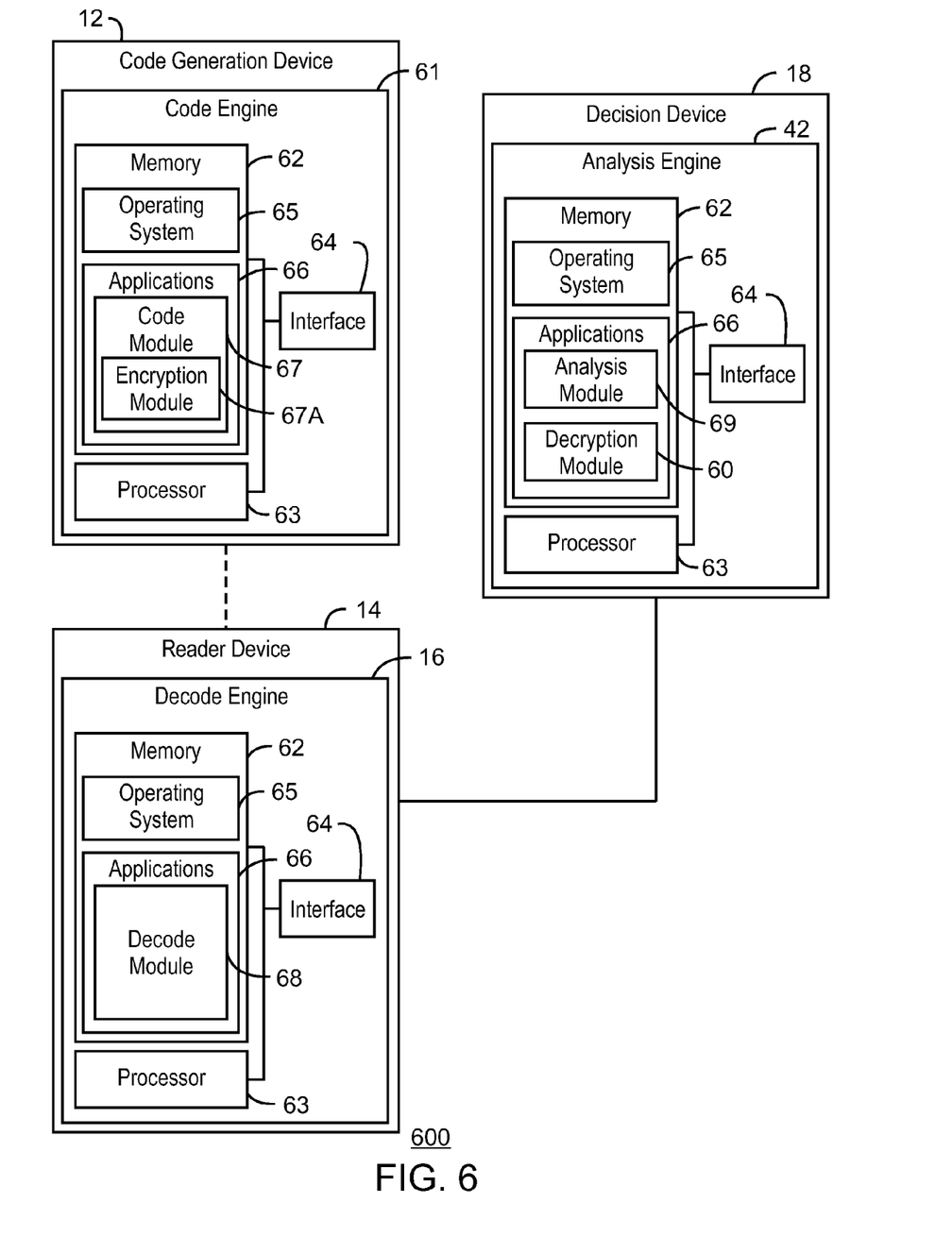
FIG. 6 illustrates a schematic view of the system of FIG. 1 according to an example.

FIG. 6 illustrates a schematic view of the system 100 of FIG. 1 according to an example. As discussed above the system 100 includes a code generation device 12, a reader device 14, and a decision device 18. The code generation device 12 may be included in a computer system, or formed from electrical components. When the code generation device 12 is part of a computer, it may include a code engine 61. The code engine 61 represents generally any combination of hardware or software to generate the information code 200. For example, the code engine 61 in FIG. 6 includes a memory 62 to store a set of instructions to generate the information code 200, a processor 63 to execute the set of instructions, and an interface 64. The processor 63 represents generally any processor configured to execute program instructions stored in memory 62 to perform various specified functions. The interface 64 represents generally any interface on the code generation device 12 that displays the information code 200.

The reader device 14 illustrated includes the decode engine 16; however, reader device 14 and the decode engine 16 may be on separate devices that are connected to one another. The decode engine 16 represents generally any combination of hardware and software to decode the information code 200. For example, the decode engine 16 in FIG. 6 includes a memory 62 to store a set of instructions to decode the information code 200, a processor 63 to execute the set of instructions, and an interface 64. The interface 64 represents generally any interface on the decision device 18 that displays the product resource 51.

The decision device 18 includes an analysis engine 42, as discussed above with reference to FIG. 4. The analysis engine 42 represents generally any combination of hardware and software to analyze the information code 200. For example, the analysis engine 42 in FIG. 6 includes a memory 62 to store a set of instructions to search the information code 200 and dynamically analyze the search results, a processor 63 to execute the set of instructions, and the interface 64.

The memory 62 is illustrated to include an operating system 65 and applications 66. The operating system 65 represents a collection of programs that when executed by the processor 63 serve as a platform on which applications 66 may run. Examples of operating systems 65 include various versions of Microsoft's Windows®, Apple's Mac OS®, and Google's Android™.

Applications 66 represent program instructions that when executed by the processor 63 function as an application. For example, in the code engine 61, the applications 66 function as an information code generator. The executable program instructions stored in memory 62 are illustrated as including a code module 67. The code module 67 represents program instructions that when executed by a processor 63 cause the implementation of the code engine 61. The executable instructions stored in the code module 67 may include the set of instructions from the memory 62 or a database external to the code engine 61. In response to the code software being initiated, the code module 67 provides instructions to the processor 63. The processor 63 executes the instructions to generate the information code 200 and provide the information code 200 to a user via the interface 64. The code module 67 may further include an encryption module 67A to encrypt the at least one of the information resource 21 and the at least one product parameter within the information code 200.

In the decode engine 16, the applications 66 function as a decoder. The executable program instructions stored in memory 62 are illustrated as including a decode module 68. The decode module 68 represents program instructions that when executed by a processor 63 cause the implementation of the decode engine 16. The executable instructions stored in the decode module 68 may include the set of instructions from the memory 62 and/or a database external to the decode engine 16. In response to the decode software being initiated, the decode module 68 provides instructions to the processor 63. The processor 63 executes the instructions to decode the information code 200 and extract the information resource 21 and the at least one product parameter 23 therefrom.

In the analysis engine 42, the applications 66 function as an analyzer and decision maker. The executable program instructions stored in memory 62 are illustrated as including an analysis module 69 and a decryption module 60. The analysis module 69 represents program instructions that when executed by a processor 63 cause the implementation of the analysis engine 42. The executable instructions stored in the analysis module 69 may include the set of instructions from the memory 62 or a database external to the analysis engine 42. In response to the analysis being initiated, the analysis module 69 provides instructions to the processor 63. The processor 63 executes the instructions to search the information resource 21 using the at least one product parameter 23 to identify at least one search result. The processor 63 further executes the instructions to dynamically analyze the at least one search result to provide the product resource 51. The product resource 51 may then be provided to a user via the interface 64.

The analysis module 42 may further include a decryption module 60. The decryption module 60 may be used prior to the analysis module 69 when the information resource 21 and the at least one product parameter 23 of the information code 200 is encrypted.

Referring to FIG. 6, the code engine 61, the decode engine 16, and the analysis engine 42 are described as combinations of hardware and programming. The hardware portions may include the processor 63. The programming portions may include the operating system 65, applications 66, or combinations thereof. The programming may be processor executable instructions stored on a tangible memory media and the hardware may include a processor 63 to execute the instructions. The memory 62 may store program instructions that when executed by the processor 63 cause the processor 63 to perform the program instructions. The memory 62 may be integrated in the same device as the processor 63 or it may be separate but accessible to that device and the processor 63.

In some examples, the program instructions may be part of software that may be executed by the processor 63 to perform a method using the system 100. The memory 62 may be a portable medium such as a CD, DVD, or flash drive or a memory maintained by a server from which the software may be downloaded and installed. In other examples, the program instructions may be part of an application or applications already installed in the product. In further examples, the memory 62 may include integrated memory such as a hard drive.

Figure 7:
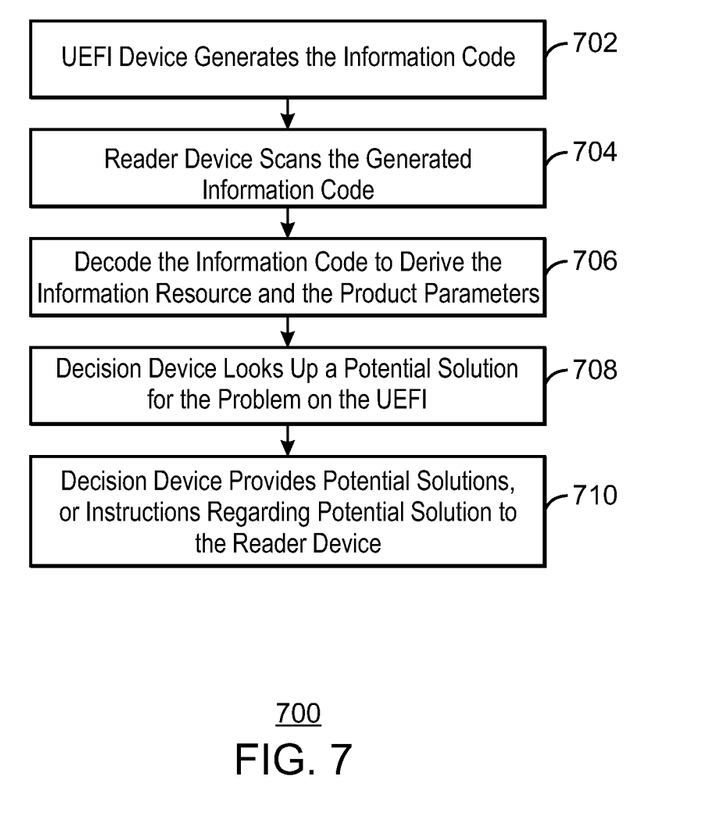
FIG. 7 illustrates a method to provide a potential solution for a UEFI device according to an example.

FIG. 7 illustrates a method 700 to provide a product resource according to an example. The method 700 begins at block 702, where a UEFI device generates the information code 200. The information code 200 may be generated in response to a specific system event, e.g., a trigger. Alternately, a user may manually transition the UEFI device from the operating system environment to the UEFI environment, and run tests or diagnostics that generate the information code 200.

At block 704, the reader device 14 scans the generated information code 200. At block 706, the information code is decoded to derive the information resource 21 and the product parameters 23. The decoding may be performed at the reader device 14 or the decision device 18.

At block 708, the decision device 18 looks up a potential solution for the problem on the UEFI device. The potential solution may be delivered via the reader device, a telephone, or by mail. At block 710, the decision device 18 may provide potential solutions, or instructions regarding potential solution to the reader device 18.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A method to access a solution identification service for a Unified Extensible Firmware Interface (UEFI) device, the method comprising:

scanning an information code generated by the UEFI device while operating according to a UEFI environment, the information code being generated in response to an error and encoding an information resource and parameters for a current state of the UEFI environment, the parameters comprising an event code and additionally a parameter describing the UEFI device;

requesting the solution identification service, wherein the request specifies to a decision device the information resource and the parameters for the current state of the UEFI environment; and presenting a representation of a response of the solution identification service.

2. The method of claim 1, comprising decoding the information code to determine the resource information and the parameters for the current state of the UEFI environment, wherein the information resource is a uniform resource locator (URL) that does not access a specific solution page.

3. The method of claim 1, wherein the response of the solution identification service is based at least in part on the parameters for the current state of the UEFI environment, wherein the information resource is a uniform resource locator (URL) that accesses the solution identification service to communicate the parameters to the solution identification service.

4. The method of claim 1, wherein presenting the representation of the response of the solution identification service comprises at least one of: providing instructions describing the potential solution, playing a video of a solution, initiating an online chat with a service representative, initiating a telephone call with a service representative, providing instructions to return at least one part of the UEFI device, providing instructions to order a part for the UEFI device, or providing a message describing the solution.

5. The method of claim 1, wherein the response of the solution identification service comprises instructions for ordering a part for the UEFI device, wherein the part is user-replaceable, and wherein the part is to be delivered to an address associated with the UEFI device.

6. The method of claim 1, wherein scanning the information code comprises a reader device scanning and decoding the information code, and wherein requesting the solution identification service comprises the reader device requesting the solution identification service.

7. The method of claim 6, wherein the reader device receives the response from the decision device, wherein the decision device comprises a server having an analysis module to determine the response, and wherein presenting the representation of the response comprises the reader device presenting the representation.

8. The method of claim 1, wherein the information code comprises a two dimensional barcode, the information resource comprises a Web address, the event code comprises an error code, and the parameter describing the UEFI device comprises product data related to the UEFI device.

9. A Unified Extensible Firmware Interface (UEFI) device comprising:

at least one processor; and at least one memory device comprising instructions that when executed cause the at least one processor to:

operate the device in a UEFI environment; and generate and display a scanable information code in response to an event in the UEFI environment, the information code comprising a URL and parameters for a current state of the UEFI environment, wherein the URL to send the parameters to a solution identification service for analysis by a decision device.

10. The UEFI device of claim 9, wherein the information code is a matrix code encoding the URL and the parameters, and wherein the matrix code is to be scanned and decoded to determine the URL and the parameters.

11. The UEFI device of claim 10, wherein a response of the solution identification service is based at least in part on the parameters, and wherein the URL is not a solution page URL.

12. The UEFI device of claim 9, wherein the parameters comprise an event code and a product parameter that describes the UEFI device.

13. The UEFI device of claim 9, wherein the parameters comprise a first parameter comprising an error code and a second parameter comprising a product parameter comprising data related to the UEFI device, and wherein the decision device of the solution identification service determines a response at least by searching information related to the parameters.

14. The UEFI device of claim 9, wherein the event comprises an error in the UEFI environment or an output of a diagnostic tool in the UEFI environment, or a combination thereof.

15. The UEFI device of claim 9, wherein the UEFI device comprises a personal computer, a household appliance, or an automobile, or any combination thereof.

16. A non-transitory, computer-readable medium comprising processor-executable instructions that when executed cause a processor to:
   scan a two-dimensional (2D) barcode that is generated by a UEFI device while the UEFI device operates according to a UEFI environment, wherein the 2D barcode comprises a uniform resource locator (URL), an error code, and one or more parameters representing a current state of the UEFI device, the 2D barcode being generated in response to an error;
   decode the 2D barcode to identify the URL, the error code, and the one or more parameters;
   request via the URL a solution from a solution identification service, wherein the request specifies the error code and the one or more parameters for the UEFI environment, wherein the solution identification service comprises a decision device to search information related to the error code and product parameter and to determine dynamically the solution based on at least the error code and the one or more parameters; and
   receive a representation of the solution.

17. The non-transitory, computer-readable medium of claim 16, wherein the URL accesses the solution identification service to communicate to the solution identification service the error code and the one or more parameters for the UEFI environment.

18. The non-transitory, computer-readable medium of claim 16, wherein the URL is not a URL to a specific solution page.

19. The non-transitory, computer-readable medium of claim 16, further comprising processor-executable instructions to order a part to be delivered, wherein the part is user-replaceable, and wherein the part is to be delivered to an address associated with the UEFI device.

20. The non-transitory, computer-readable medium of claim 19, further comprising processor-executable instructions to present how to replace the part.

* * * * *